United States Patent [19]
Bottomley

[11] Patent Number: 6,154,507
[45] Date of Patent: Nov. 28, 2000

[54] SYSTEM AND METHOD FOR SIGNAL DEMODULATION

[75] Inventor: Gregory E. Bottomley, Cary, N.C.

[73] Assignee: Ericsson Inc, Research Triangle Park, N.C.

[21] Appl. No.: 08/996,328

[22] Filed: Dec. 22, 1997

[51] Int. Cl.⁷ .............................. H03D 1/00; H04L 27/06
[52] U.S. Cl. ............................ 375/340; 714/796
[58] Field of Search .................... 375/262, 265, 375/341, 340, 263, 290; 714/792, 795, 796, 794, 791

[56] References Cited

U.S. PATENT DOCUMENTS

| | | | |
|---|---|---|---|
| 5,291,524 | 3/1994 | Itakura et al. | 375/94 |
| 5,295,142 | 3/1994 | Hatakeyama | 371/43 |
| 5,375,129 | 12/1994 | Cooper | 371/43 |
| 5,499,272 | 3/1996 | Bottomley | 375/347 |
| 5,577,068 | 11/1996 | Bottomley et al. | 375/232 |
| 5,581,568 | 12/1996 | Togami | 371/43 |

FOREIGN PATENT DOCUMENTS 0 632 623 A2   6/1994   European Pat. Off. .

OTHER PUBLICATIONS

Ungerbroeck, Gottfried, Adaptive Maximum–Likelihood Receiver for Carrier–=Modulated Data–Transmission Systems, IEEE Transactions on Communications, vol. Com–22, No. 5, May 1974.

*Primary Examiner*—Chi H. Pham
*Assistant Examiner*—Jean B Corrielus
*Attorney, Agent, or Firm*—Jenkens + Gilchrist

[57] ABSTRACT

An improved system and method for reducing the computational complexity of metric updating, such as within a maximum likelihood-sequence-estimation (MLSE) detector, used in, for example, demodulating a received signal subject to intersymbol interference. Complexity is reduced by eliminating the computation of common portions of a series of path metrics and perform a full computation of the next state after the optimum path to the next state has been determined. Alternatively, a primary path metric is determined and key components of secondary path metrics are examined to determine secondary path viability. If the secondary path is viable, the full secondary path metric is formed and compared to the primary path metric, which is replaced if the secondary is better.

18 Claims, 3 Drawing Sheets

SYSTEM AND METHOD FOR SIGNAL DEMODULATION

BACKGROUND OF THE PRESENT INVENTION

1. Field of the Invention

The present invention relates to a system and method for signal demodulation, particularly to a system and method for reducing the computational complexity of demodulating a signal.

2. Background and Objects of the Present Invention

Digital wireless communication systems are used to convey a variety of information between remotely located users. With digital communications, such information is translated into a digital or binary form, commonly referred to as bits, for communications purposes. A transmitter maps this bit stream into a modulated symbol stream, which is detected at a digital receiver and mapped back into bits whereby information content is conveyed.

In digital wireless communications, however, the radio environment presents many difficulties that impede successful communications. One difficulty is that the signal level can fade as a result of the signal traveling multiple paths due to being reflected, causing some signal images to arrive at the receiver antenna out of phase. This type of fading is commonly referred to as Rayleigh fading or fast fading. When a signal so fades, the signal-to-noise ratio becomes lower, causing degradation in the quality of the communication link.

A second problem occurs when the multiple signal paths have significantly different lengths. In this case, time dispersion occurs, in which multiple fading signal images arrive at the receiver antenna at different times, thereby giving rise to signal echoes or rays. This causes intersymbol interference (ISI), where the echoes of one symbol interfere with that of subsequent symbols.

At the receiver, although coherent demodulation of an incoming signal is desirable for best performance, for such coherent demodulation the characteristics of the multipath channel must be known. However, in many wireless applications, the multipath channel is time varying due to transmitter motion, receiver motion, and/or scatterer motion. Thus, there is a need to track a time varying multipath channel.

To provide coherent demodulation of multipath signals, a maximum-likelihood-sequence-estimation (MLSE) detector, such as an MLSE equalizer, may be employed. The MLSE equalizer considers various hypotheses for the transmitted symbol sequence, and, with a model of the dispersive multipath channel, determines which hypothesis best fits the received data. An MLSE equalizer may be efficiently realized using a Viterbi algorithm, which is a technique well known to those skilled in the art.

The aforedescribed conventional MLSE equalizer can better be explained by a simple example, such as also set forth in U.S. Pat. No. 5,577,068, entitled "Generalized Direct Update Viterbi Equalizer", of which the present inventor is a co-inventor. With reference now to FIG. 1 of the figures, suppose a transmitter 10, such as a mobile phone, transmits a symbol stream b(n), which takes on +1 or −1 state values corresponding to bit values 0 and 1, respectively. This symbol stream may be modulated using binary phase-shift keying (BPSK). At a receiver 20, such as a base station in a cellular telephone system, the received signal is filtered, amplified, and mixed down using I and Q carriers, then sampled once every symbol period (T), generating a received signal stream r(n). In this example, the intervening channel consists of two fading rays, a main ray and an echo, where the echo arrives T seconds later. Accordingly, the received signal can be modeled as:

$$r(n) = c_0 b(n) + c_1 b(n-1) + w(n) \quad (1)$$

where $c_0$ and $c_1$ are complex channel tap values and w(n) is additive noise or interference.

In an MLSE equalizer 30 of the present example, also shown in FIG. 1, at iteration n there would be two different previous "states", 0 and 1, corresponding to the two possible values for b(n−1), i.e., +1(0) and −1(1). Associated with each previous state would be an accumulated metric, accumulated from previous iterations and giving rise to respective accumulated metrics $P_0(n-1)$ and $P_1(n-1)$. There would also be two current states, corresponding to the two possible values for b(n). Each possible pairing of a previous state with a current state corresponds to a hypothetical sequence $\{b_h(n-1), b_h(n)\}$. For each hypothesis, the predicted, hypothesized received signal value would be:

$$r_h(n) = c_0 b_h(n) + c_1 b_h(n-1) \quad (2)$$

The corresponding "branch" metric would be given by $$M_h(n) = |r(n) - r_h(n)|^2 \quad (3)$$

The candidate metric for a current state would be the sum of the branch metric and the previously accumulated metric associated with $b_h(n-1)$. As noted, for each current state, there are two possible previous states, where the previous state which gives the smallest candidate metric is selected as the predecessor state. Accordingly, the selected candidate metric becomes the accumulated metric for that current state.

Thus, for current state 0 in the instant example, there would be two hypothetical sequences $\{+1, +1\}$ and $\{-1, +1\}$, referred to as hypotheses h=00 and h=10. This gives rise to two candidate metrics:

$$C_{00}(n) = P_0(n-1) + M_{00}(n) \quad (4a)$$

and $$C_{10}(n) = P_1(n-1) + M_{10}(n) \quad (4b)$$

In the present example, the smaller of these two candidate metrics gives the accumulated metric for current state 0. The corresponding previous state becomes the predecessor state to state 0 at time n. In other words, if $C_{10}(n) < C_{00}(n)$, then the accumulated metric for current state 0 at time n becomes:

$$P_0(n) = C_{10}(n) \quad (5)$$

otherwise $P_0(n) = C_{00}(n)$. The predecessor state and its predecessor and so forth are referred to as the path history of the current state. A similar procedure is applied to current state 1, in which case the two hypotheses are h=01 and h=11.

The detected symbols are decided by one of two methods. In the first method, all of the data are processed first. Then, the final state with the best metric is determined. The path history of this state (i.e. the predecessor states) gives the detected or demodulated data. In the second method, detection decisions are made before all of the data are processed. At time n, for instance, the symbol transmitted at time n−τ is decided, where τ is referred to as the decision depth. This is performed by finding the state at time n with the best metric and using its path history to determine the detected symbol at time n−τ.

In general, the time varying channel consists of a number of channel taps that vary with time. After filtering, mixing down to baseband, and sampling, the received data samples r(n) can be modeled as:

$$r(n)=c_0(n)b(n)+c_1(n)b(n-1)+ \ldots + w(n) \qquad (6)$$

where b(n) is the transmitted symbol stream, $c_i(n)$ are the time dispersive channel taps, and w(n) is additive noise. It is convenient to use vector notation and to express the received data samples more simply as:

$$r(n)=c^T(n)x(n)+w(n) \qquad (7)$$

where c(n) is a vector of channel taps and x(n) is a vector containing the current and past transmitted symbols. The superscript "T" denotes the transpose.

The demodulator relies on channel tap estimates, $c_{est}(n)$ to predict received values for various hypothetical symbol sequences $x_h(n)$. These predicted values, referred to as target values, $t_h(n)$, are given by:

$$t_h(n)=c_{est}^T(n)x_h(n) \qquad (8)$$

The target values $t_h(n)$ are used to form branch metrics given by, for example, $$M_h(n)=|r(n)-t_h(n)|^2 \qquad (9)$$

or some equivalent metric. These metrics are accumulated and used to determine the demodulated symbol sequence.

The channel tap estimates must be updated to track a time-varying channel. This is done by making a tentative decision as to what symbols were transmitted up to some time n, usually less than the iteration time, and generating a string of symbols, $b_{det}(n)$, $b_{det}(n-1)$ . . . , which can be formed into a vector $x_{det}(n)$. Typically, an error signal e(n) is used to update the channel tap estimates, where the error signal is given by the difference in what was received and what was predicted. The error signal e(n) is given by the equation:

$$e(n)=r(n)-c_{est}^T(n)x_{det}(n) \qquad (10)$$

Once the channel taps have been updated, giving $c_{est}(n+1)$, the channel taps can be used to form new predictions, $t_h(n+1)$. A single channel estimate is maintained or multiple channel models (one per state) can be used.

As noted, in the aforementioned MLSE detector, such as the MLSE equalizer 30 shown in FIG. 1, a sequence estimation algorithm, such as the aforedescribed Viterbi algorithm, is used to determine the most likely transmitted sequence. At each iteration, a number of possible sequences are considered, each resulting in a path metric. For each state, which corresponds to the L most recently transmitted symbols, only one set of sequences is kept, the remainder discarded or "pruned", as is understood in the art. See, for example, U.S. Pat. No. 5,191,598 to Bäckström et al. Accordingly, at each iteration, and for each state in the sequence estimation process, candidate metrics may be formed and the best one, e.g., the smallest, becomes the updated path metric. The corresponding previous symbol values then become part of the path history.

In view of the above, it is clear that the complexity of the aforementioned sequence estimation algorithm is nontrivial, particularly where the received signal depends on a greater number of bits. Accordingly, with candidate metrics formed at each iteration and for each state, a considerable amount of computational power is required to perform the requisite operations in the sequence estimation algorithm, such as within the MLSE equalizer 30.

Heretofore, "brute force" approaches have been used where all of the potential candidate metrics are first formed and then compared against one another, e.g., the aforedescribed candidate metrics $C_{00}(n)$ and $C_{10}(n)$ are computed and the resultant values compared. Although some techniques utilize efficient branch metrics and share computations during branch metric formation, these techniques nonetheless compute the full candidate metric, requiring a considerable number of computations, despite the efficiency savings.

Recently, other techniques have been developed for reducing complexity in the path selection (pruning) process for real signals and amplitude modulation. See, for example, M. P. C. Fossorier, "Dynamic Quantization for Maximum Likelihood Sequence Detection of PAM Signaling", *IEEE Trans. Commun.*, Vol. 44, pp. 1444–54, November 1996. In the path selection process, for example, the symbol set is partitioned into a subset of common symbols (L−1 symbols) and a set of differing symbols (1 symbol). This allows the formation of thresholds that are applied to branch metrics or received data values. However, if this approach were extended to complex channels and phase modulation, the computation of the thresholds then becomes increasingly complicated.

It is, accordingly, an object of the present invention to reduce the amount of computation required in a sequence estimation process.

It is a further object of the present invention to provide an alternative to the aforementioned path selection techniques, such alternative being particularly useful for complex channels and phase modulation.

SUMMARY OF THE INVENTION

The present invention is directed to an improved system and method for reducing the computational complexity of path metric updating such as within a maximum likelihood-sequence-estimation (MLSE) detector. MLSE detectors are used, for example, in demodulating a received signal subject to intersymbol interference. Complexity is reduced by eliminating the computation of common portions of a series of candidate path metrics and performing a full computation of the selected candidate metric after the optimum path to the next state has been determined. Alternatively, a primary path metric is determined and key components of secondary path metrics are examined to determine secondary path viability. If the secondary path is viable, the full secondary path metric is formed and compared to the primary path metric, which is replaced if the secondary is better.

BRIEF DESCRIPTION OF THE DRAWINGS

The present invention will now be described in more detail with reference to preferred embodiments of the present invention, given only by way of example, and illustrated in the accompanying drawings, in which.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The system and method of the present invention is directed to improvements in the implementation of a sequence estimation algorithm by reducing the number of computational operations required when forming the candidate metrics. In particular, the proposed solution according to the system and method of the present invention (mode A) is to exploit the presence of common terms appearing within the candidate metrics, and avoiding computations of such duplicative common terms until after the path selection, eliminating a substantial amount of computations pertaining to the potentially numerous non-selected paths.

Figure 1:
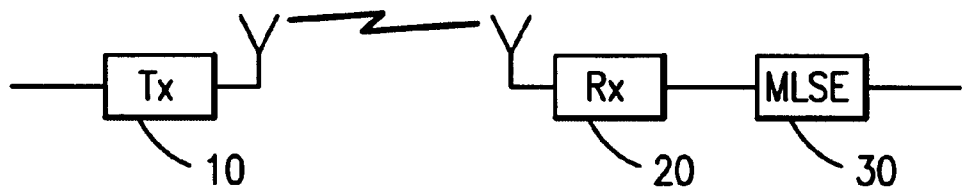
FIG. 1 illustrates a block diagram of a system utilizing the improved demodulation methods of the present invention.
Figure 2:
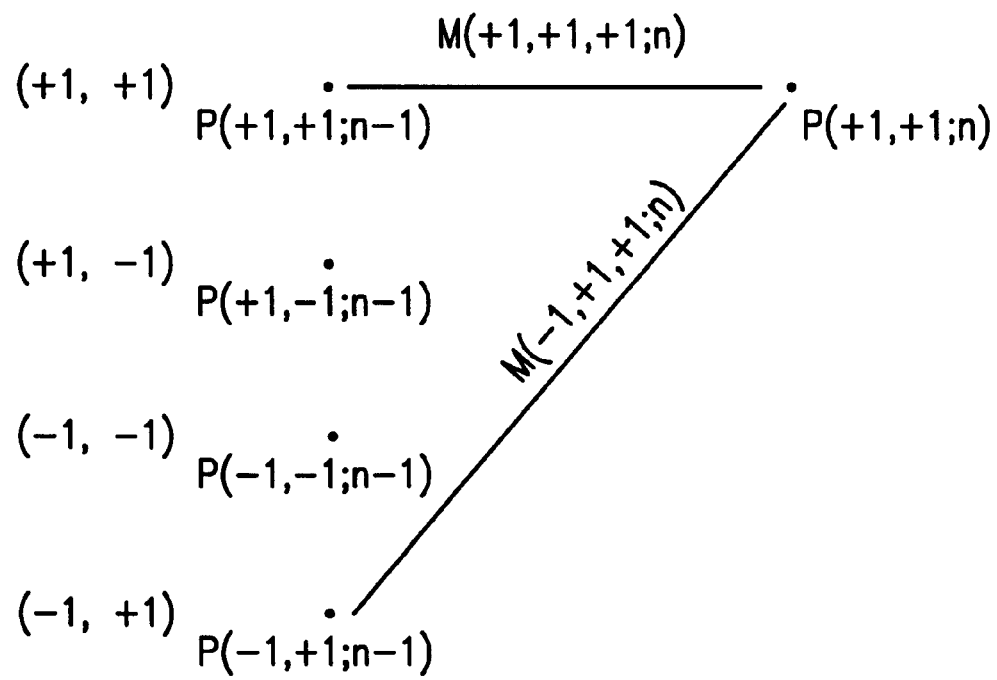
FIG. 2 gives an example of path metric updating.

As noted, in the brute force approach all candidate metrics must be formed and compared even though only one is selected. In conventional MLSE detectors, therefore, all possible data sequences (rather than actually decoding each received symbol by itself) are tested, and that data sequence with the maximum probability as the output is selected. By way of example, consider a computation based upon the Ungerboeck metric where the received signal samples are modeled, as set forth in equation (11), as follows:

$$r(n) = c_0 b(n) + c_1 b(n-1) + c_2 b(n-2) + w(n) \qquad (11)$$

where the $c_i$ are channel tap values, $b(n)$ are transmitted symbol stream values and $w(n)$ is noise. A state at time n corresponds to values for $b(n-1)$ and $b(n)$, and a state at time $n-1$ corresponds to values for $b(n-2)$ and $b(n-1)$, as illustrated in FIG. 2. Thus, all candidate metrics for a given state at time n will hypothesize the same values for $b(n)$ and $b(n-1)$, and any terms in the candidate metrics which depend upon these symbols only can be omitted. Using a metric patterned after the aforementioned Ungerboeck technique for discrete-time signals, a branch metric at time n may be expressed as:

$$M(b_h(n-2), b_h(n-1), b_h(n)) = \Re\{b(n)[2z(n) - s_0 b_h(n) - 2s_1 b_h(n-1) - 2s_2 b_h(n-2)]\} \qquad (12)$$

where $b_h(n)$ corresponds to a hypothetical value for symbol $b(n)$, and $$z(n) = c^*_0 r(n) + c^*_1 r(n+1) + c^*_2 r(n+2), \qquad (13)$$

$$S_0 = |c_0|^2 + |c_1|^2 + |c_2|^2, \qquad (14)$$

$$S_1 = c^*_0 c_1 + c^*_1 c_2, \text{ and} \qquad (15)$$

$$s_2 = c^*_0 c_2 \qquad (16)$$

where superscript "*" denotes complex conjugation. It should be understood from the above that the candidate metrics associated with a particular state will all correspond to the same values for $b_h(n)$ and $b_h(n-1)$. Only the values for $b_h(n-2)$ will differ. Also, let $P(b_h(n-2), b_h(n-1))$ denote the accumulated path metric at time $n-1$. Accordingly, for path selection purposes, the following partial candidate metrics can be formed, for, for example, the state $\{b_h(n-1)+1, b_h(n)=+1\}$, as follows:

$$C'(+1, +1, +1;n) = P(+1, +1;n-1) - 2\Re\{s_2\} C'(-1, +1, +1;n) = P(-1, +1;n-1) + 2\Re\{s_2\} \qquad (17)$$

Whichever is largest is the selected path, which corresponds to some selected value for $b(n-2)$, for instance, $-1$ in this example.

In view of the above, an updated path metric is then formed using:

$$P(+1, +1;n) = C'(-1, +1, +1;n) + \Re\{b_h(n)[2z(n) - s_0 b_h(n) - 2s_1 b_h(n-1)]\} \qquad (18)$$

It should be understood, however, that if a form of M-ary Phase Shift Keying (MPSK) is used, the $s_0$ may be omitted and the factors of 2 ignored. A similar process occurs when updating the other state at time n.

While the above example corresponds to binary symbols ($+1$ and $-1$), it will be obvious to one of ordinary skill in the art how the invention operates when there are M possible symbol values and/or the symbol values can be multi-dimensional. For example, with Quadrature Phase Shift Keying (QPSK) modulation, two binary symbols, which form one 4-ary symbol, are sent at the same time, one on the in-phase (I) carrier and one on the quadrature (Q) carrier. At the receiver, the in-phase and quadrature components of the received signal can be extracted. This is typically thought of as complex-valued signal samples, where the real part corresponds to the I component and the imaginary part corresponds to the Q component. Thus, $r(n) = r_I(n) + jr_Q(n)$, where j denotes the square root of $-1$. The symbol values would then be one of four values: $+1$, $-1$, $+j$, and $-j$. Thus, for the example above, there would be four candidate metrics, and four partial candidate metrics would be formed. Once three were eliminated, the winning partial candidate metric would be used to form the path metric.

It should be understood that the aforedescribed preferred embodiment of the present invention is directed to improvements in the formation of the aforementioned partial metrics, which are used in path selection. Once the chosen path has been selected from the pack of partial metrics through calculations omitting the common terms therein, only then is the full path metric determined, employing the full amount of computations to the selected metric only. It should, of course, be further understood that the technique set forth in the present invention may be adapted further, such as by partitioning the candidate metrics into subsets with even more common terms so that subsequent terms are added only to the "winners" of the first round of selection.

In an attempt to further describe the preferred embodiment of the present invention, also referred to herein as mode A, it may be stated simply that, in forming candidate metrics, only the parts unique to each previous state are included until after the surviving candidate metric, i.e., the one with the best metric, has been chosen. At that point, the portion of the metric common to the current state is added in once to the surviving metric.

In general, the candidate metrics for current state i at iteration n can be expressed as:

$$C(k,i;n) = C'(k,i;n) + D(i;n) \qquad (19)$$

where k corresponds to a previous state, $C'(k,i;n)$ is the part of the candidate metric that depends at least on k and possibly i as well, and $D(i;n)$ depends only on the current state i at time n. In determining which k is the surviving state, there is no need to consider the term $D(i;n)$ which does not depend on k. Thus partial candidate metrics are computed and compared. The winning metric is then used, with $D(i;n)$ added, to form the new path metric.

Figure 3:
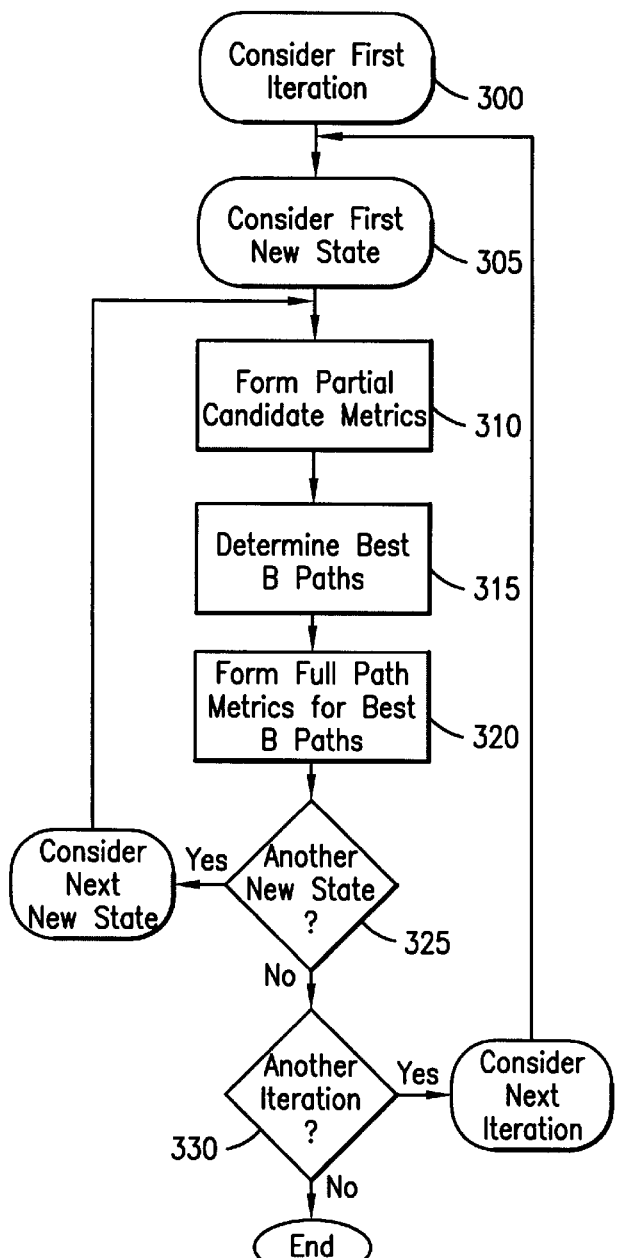
FIG. 3 illustrates a flow diagram according to one embodiment of the present invention.

Also, it is possible to keep more than one path per state. This is referred to as the list Viterbi algorithm or the generalized Viterbi algorithm. Thus, one might keep B paths per state, where B is typically 1 or 2. A flow diagram of the preferred mode A embodiment is shown in FIG. 3, where the first step (step 300) is to consider the first iteration. The first state is then considered (step 305), partial metrics formed (step 310) and the best B paths determined (step 315). Full path metrics for the best B paths are then computed (step 320). If further states are to be considered (step 325), control is transferred to step 310. If all states have been considered, a determination is made whether further iterations are needed (step 330). If so, control is shifted back to step 305; otherwise, the process ends.

In an alternative embodiment of the present invention, also referred to herein as mode B, full candidate metrics, starting with the best previous state, are formed, common portions of the computations being used in forming the subsequent metrics. For the aforedescribed Euclidian distance metric, path metrics cannot become smaller (negative distances) and can only get larger. Accordingly, should the extension of the best previous state metric be smaller than the path metrics associated with the other previous states, then there is no need to consider these other previous states further. In an ideal situation, one would extend states starting with the best state and work towards the worst state. It should be understood that in practice, the best state is often known for channel tracking purposes.

Figure 4:
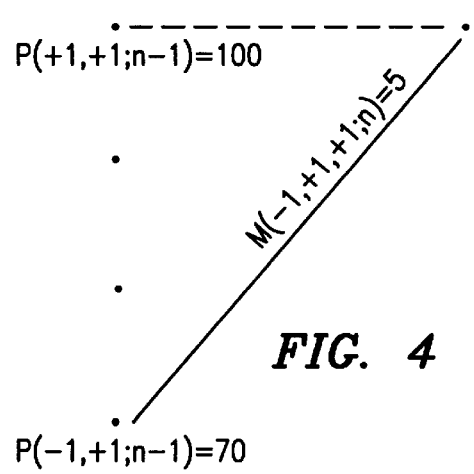
FIG. 4 gives a numerical example of path metric updating.

An illustration of how this alternative embodiment operates is shown in FIG. 4 where a "best" or primary state is one having the smallest metric with positive branch metrics, such as the Euclidian distance metric. After formation of the candidate metric for the primary state valued at 75 (previous path metric value 70 plus the indicated branch metric value 5), it is clear that this candidate metric will be less than the other candidate metrics could possibly be since the other previous path metric is 100. Accordingly, there is no need to compute the other candidate metric. As discussed before, this is readily extended to incorporate complex samples and/or M-ary symbol values.

In the previous example, the primary candidate path is identified by having the smallest previous state metric. After the primary candidate path metric is determined, secondary paths are considered. Instead of computing secondary candidate path metrics, however, only a component, the "key component", of the secondary path candidate metric is examined. In the example, this key component is the previous state metric. The key component is compared to the primary path candidate metric to see if the secondary path could survive. If not, the secondary path is discarded, without needing to compute the full secondary path candidate metric.

Figure 5:
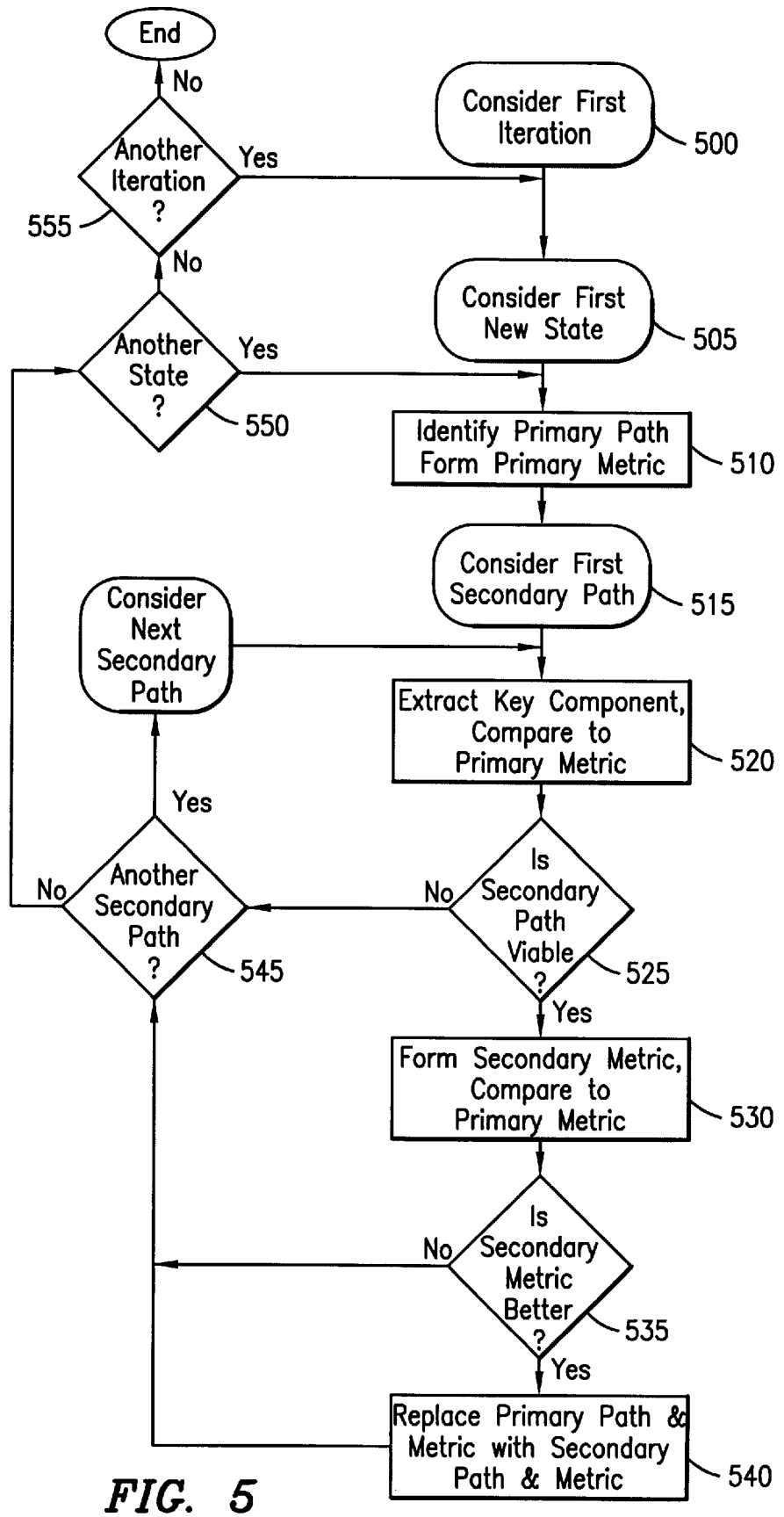
FIG. 5 illustrates a flow diagram according to another embodiment of the present invention.

In general, the primary path can be identified in a number of ways. It could correspond to the path with the smallest branch metric. Also, the "Key component" for the secondary path could be a branch metric instead of the previous state path metric. A general flow diagram of the operation of Mode B is illustrated in FIG. 5, which, as with FIG. 3, considers the first iteration (step 500) and new state (step 505), the primary path is then identified and the primary metric is forward (step 510) and secondary paths are considered (step 515). Key components of the secondary paths are then extracted and compared to the primary metric (step 520). A determination is then made whether a given secondary path is a viable solution (step 525). If so, a secondary metric for that path is formed and compared to the primary metric (step 530). If the secondary metric is better than the aforementioned primary metric (step 535), the primary path and metric are replaced with the corresponding secondary path and metric (step 540).

If the secondary path is not viable (step 525) or the secondary metric suboptimal (step 535) or the primary path has been replaced, a determination is then made whether another secondary path exists (step 545). If so, control is transferred back to step 520 for extraction and comparison; otherwise, a determination is made whether there is another state (step 550). If so, control is transferred to step 510, otherwise, a determination is made whether there is another iteration (step 555). If so, control reverts back to step 505; otherwise, the process ends.

It should be understood that usage of the techniques of the present invention depend upon the signal-to-noise ratio (SNR). Where the SNR is high, i.e., signal fidelity is good with low distortion, typically only one candidate metric is formed. Consequently, there is little need for a path determination. With decreasing SNR, however, multiple paths are possible and multiple candidate metrics are formed. Accordingly, the computation reduction techniques set forth in the present invention may be turned on and off in accordance with the amount of signal interference present, switching between a mode A (low SNR) and a mode B (high SNR) in accordance with signal conditions.

Criteria for switching from mode A (a poor signal environment) to mode B (good signal environment) may include:

(a) favorable frame erasure rate (FER), carrier/interference level ratio (C/I), average bit error rate (BER) or other figure of merit, such as the BER of the sync word;

(b) consistent dominance of one path metric over others; and (c) occasional switch to the alternate mode to determine if the system, or, in particular, the receiver, can operate better in that mode. If not, the system switches back.

Alternatively, criteria for switching from mode B to mode A may include:

(d) all or most candidate metrics are being consistently computed; and (e) the aforedescribed FER, C/I, average BER, etc., may also be used.

It should be understood that the techniques set forth herein can be applied in various other contexts other than that of MLSE equalization and may be applied to any modulation, including amplitude and phase modulation. It should further be understood that the present invention is applicable to a variety of branch metrics, including Forney, Ungerboeck, direct update, and the partial Ungerboeck metric discussed in U.S. Pat. No. 5,499,272 to Bottomley. The present invention is further suitable for use with adaptive channel estimation, although channel tracking error signals may be required.

It should also be understood that the techniques of the present invention may be extended to include fractionally-spaced equalization, diversity, multi-user detection, and per survivor processing (multiple channel models). Furthermore, other MLSE applications are contemplated within the scope of the present invention, including convolutional decoding and coded modulation decoding (both trellis and block). It should additionally be understood that the present invention may also be used in conjunction with other sequence estimation algorithms (list Viterbi, Fano algorithm) as well as algorithms with more pruning, such as the M and T algorithms, or tree searching with pruning.

While the present invention has been described with respect to digital symbol detection using a sequence detection algorithm, the present invention is also applicable to other applications involving dynamic programming. In general, dynamic programming involves finding the best combination of items. A typical example is the traveling salesman problem, in which the goal is to find the shortest route from point A to goal is to find the shortest route from point A to point B across a number of different pathways therebetween. The goal is to find the set of roads that minimizes the distance traveled.

The previous description is of preferred embodiments for implementing the invention, and the scope of the invention should not necessarily be limited by this description. The scope of the present invention is instead defined by the following claims.

What is claimed is:

1. A method for demodulating a symbol sequence comprising the steps of:
   receiving a portion of a transmission signal, forming a received signal, said received signal having a received signal level associated therewith and including a plurality of symbols, said plurality of symbols forming a symbol stream;
   sampling said received signal at symbol period intervals, forming a received symbol stream, said received symbol stream having a present state and a plurality of previous states associated therewith;
   calculating, from a plurality of metrics formed from at least one previous state of said received symbol stream, a multiplicity of partial candidate metrics;
   eliminating, from each of said multiplicity of partial candidate metrics, at least one common term therein;
   calculating respective current state metrics from each of said multiplicity of partial candidate metrics without a common operator;
   selecting a given one of said partial candidate metrics without said common operator, said selected given one of said partial candidate metrics without said common operator being a winning partial candidate metric;
   recalculating said given partial candidate metric with said common operator; and
   forming a new full path metric, wherein said full path metric includes said winning partial candidate metric.

2. The method according to claim 1, further including the step of calculating, based upon said previous-state metrics of said received symbol stream, a first multiplicity of candidate metrics including at least one common operator therein, wherein said common term is a common operator.

3. The method according to claim 1, wherein said given partial candidate metric is a Euclidian distance metric.

4. The method according to claim 1, wherein said step of forming a new full path metric includes adding said winning candidate metric to said respective current-state metrics.

5. The method according to claim 1, further including the step of determining whether another new state exists.

6. The method according to claim 1, further including performing a plurality of iterations to determine full path metrics.

7. The method according to claim 1, further including the steps of:
   identifying a primary path; and
   forming a primary path metric based upon said primary path.

8. The method according to claim 7, further comprising the steps of:
   extracting a key component different from said metrics of said previous state;
   determining whether a secondary path is viable based upon said key component;
   forming a secondary path metric based upon said secondary path; and
   replacing said primary path metric if said secondary path metric is better than said primary path metric.

9. The method according to claim 8, wherein said key component is a branch metric.

10. A sequence detector for detecting a symbol sequence within a received symbol stream, said sequence detector comprising:
    first calculation means for calculating, from a plurality of metrics formed from at least one previous state of said received symbol stream, a multiplicity of partial candidate metrics;
    elimination means for eliminating, from each of said multiplicity of partial candidate metrics, at least one common term therein;
    second calculation means for calculating respective current state metrics from each of said multiplicity of partial candidate metrics without a common operator;
    selection means for selecting a given one of said partial candidate metrics without said common operator, said selected given one of said partial candidate metrics without said common operator being a winning partial candidate metric;
    recalculation means for recalculating said given partial candidate metric with said common operator; and
    formation means for forming a new full path metric, wherein said full path metric includes said winning partial candidate metric.

11. The sequence detector for detecting a symbol sequence according to claim 10, further comprising:
    third calculation means for calculating, based upon said previous-state metrics of said received symbol stream, a first multiplicity of candidate metrics including at least one common operator therein, wherein said common term is a common operator.

12. The sequence detector for detecting a symbol sequence according to claim 10, wherein said given partial candidate metric is a Euclidian distance metric.

13. The sequence detector for detecting a symbol sequence according to claim 10, wherein said formation means includes adding said winning candidate metric to said respective current-state metrics.

14. The sequence detector for detecting a symbol sequence according to claim 10, further comprises determination means for determining whether another new state exists.

15. The sequence detector for detecting a symbol sequence according to claim 10, further comprising iteration means for performing a plurality of iterations to determine full path metrics.

16. The sequence detector for detecting a symbol sequence according to claim 10, further comprising:
    identification means for identifying a primary path; and
    formation means for forming a primary path metric based upon said primary path.

17. The sequence detector for detecting a symbol sequence according to claim 16, further comprising:
    extraction means for extracting a key component different from said metrics of said previous state;
    determination means for determining whether a secondary path is viable based upon said key component;

formation means for forming a secondary path metric based upon said secondary path; and replacement means for replacing said primary path metric if said secondary path metric is better than said primary path metric.

18. The sequence detector for detecting a symbol sequence according to claim 17, wherein said key component is a branch metric.

* * * * *